United States Patent
Zhidkov et al.

(10) Patent No.: US 7,580,468 B2
(45) Date of Patent: Aug. 25, 2009

(54) SYNCHRONIZATION CIRCUITS, ORTHOGONAL FREQUENCY DIVISION MULTIPLEXING (OFDM) RECEIVERS, AND RELATED METHODS AND COMPUTER PROGRAM PRODUCTS

(75) Inventors: Sergey Zhidkov, Gyeonggi-do (KR); Jin-Hee Cheon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 286 days.

(21) Appl. No.: 11/495,278

(22) Filed: Jul. 28, 2006

(65) Prior Publication Data

US 2008/0025417 A1    Jan. 31, 2008

(51) Int. Cl.
*H04K 1/10* (2006.01)
(52) U.S. Cl. .................. 375/260; 375/344; 375/354
(58) Field of Classification Search ............... 375/316, 375/344, 354, 260, 267
See application file for complete search history.

(56) References Cited

U.S. PATENT DOCUMENTS

| | | | |
|---|---|---|---|
| 4,852,094 A * | 7/1989 | Wang | 714/735 |
| 6,058,121 A * | 5/2000 | Kim et al. | 370/480 |
| 6,208,695 B1 * | 3/2001 | Klank et al. | 375/260 |
| 6,434,205 B1 | 8/2002 | Taura et al. | |
| 6,771,591 B1 * | 8/2004 | Belotserkovsky et al. | 370/210 |
| 7,308,034 B2 * | 12/2007 | Jeon et al. | 375/260 |
| 2003/0016773 A1 * | 1/2003 | Atungsiri et al. | 375/355 |
| 2005/0047325 A1 * | 3/2005 | Singh et al. | 370/210 |
| 2005/0213680 A1 * | 9/2005 | Atungsiri et al. | 375/260 |

FOREIGN PATENT DOCUMENTS

| | | |
|---|---|---|
| JP | 11-346206 | 12/1999 |
| JP | 2004-153831 | 5/2004 |
| KR | 1020040001591 A | 1/2004 |

* cited by examiner

*Primary Examiner*—Chieh M. Fan
*Assistant Examiner*—Freshteh N. Aghdam
(74) *Attorney, Agent, or Firm*—Myers Bigel Sibley & Sajovec (57) ABSTRACT

Synchronization circuits are provided for orthogonal frequency division multiplexing (OFDM) receivers. The synchronization circuits include a fast Fourier transform (FFT) processor and a synchronization unit. The FFT processor is configured to perform FFT of an input signal. The synchronization unit is configured to obtain a channel impulse response (CIR) using an output signal of the FFT processor and relocate an FFT window based on the CIR. Related receivers, methods and computer program products are also provided.

16 Claims, 7 Drawing Sheets

SYNCHRONIZATION CIRCUITS, ORTHOGONAL FREQUENCY DIVISION MULTIPLEXING (OFDM) RECEIVERS, AND RELATED METHODS AND COMPUTER PROGRAM PRODUCTS

FIELD OF THE INVENTION

The present invention relates to synchronization circuits and related methods, and more particularly, to synchronization circuits for use with orthogonal frequency division multiplexing (OFDM) receivers and related methods.

BACKGROUND OF THE INVENTION

Orthogonal frequency division multiplexing (OFDM) transmission may be used to guard against multipath fading and typically supports a high bandwidth. Accordingly, OFDM transmission is widely used in digital multimedia broadcasting (DMB), digital audio broadcasting (DAB), digital video broadcasting (DVB), and the like.

In OFDM, a transmitter modulates a signal using inverse fast Fourier transform (FFT) (IFFT) and a receiver demodulates the signal using FFT. Accordingly, when frequency synchronization and time synchronization are not achieved, the performance of an OFDM system is degraded.

When frequency synchronization fails, the amplitude and phase of a demodulated signal may be distorted and interference may occur between sub-channels. When time synchronization fails, as well as phase distortion and interference between sub-channels, inter-symbol interference (ISI) with a neighboring symbol may occur in a demodulated signal. Intersymbol interference (ISI) may weaken the advantage of an OFDM system with respect to multipath fading. In order to reduce the likelihood of ISI, an OFDM receiver typically adjusts a symbol window position, i.e., a position of an FFT window. Generally, to adjust an FFT window to an exact position, a special training symbol having an autocorrelation function with excellent properties is inserted at the beginning of an OFDM transmission frame.

A synchronization circuit of an OFDM receiver obtains a correlation function between a training symbol received by the OFDM receiver and a training symbol generated in the OFDM receiver and generates a channel impulse response (CIR). The OFDM receiver adjusts the position of an FFT window based on the CIR and performs time synchronization. To adjust the position of the FFT window, the OFDM receiver may perform convolution of a known training symbol and a received training symbol. The convolution may be directly performed in a time domain or indirectly performed. It may be more efficient to indirectly perform the convolution by performing FFT and IFFT in a frequency domain. In other words, the known training symbol and the received training symbol are fast Fourier transformed and then multiplied by each other. Thereafter, a signal corresponding to a multiplication result is inverse fast Fourier transformed, whereby a CIR is obtained. This method may be more efficient and more widely used than the direct convolution in the time domain.

Figure 1:
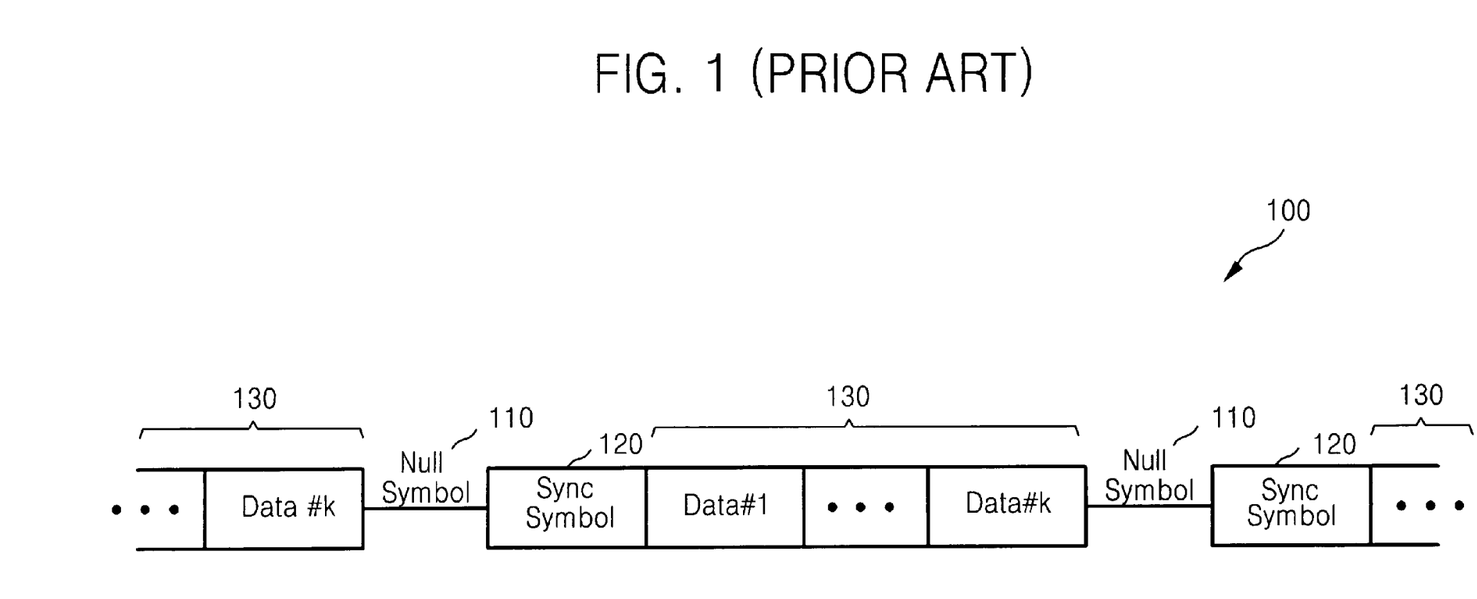
FIG. 1 is a diagram illustrating exemplary orthogonal frequency division multiplexing (OFDM) transmission frames.

Referring first to FIG. 1, an exemplary OFDM transmission frame 100 will be discussed. The OFDM transmission frame 100 may be used in Digital Audio Broadcasting (DAB) and Terrestrial-DAB (T-DAB). As illustrated in FIG. 1, the OFDM transmission frame 100 includes a null symbol 110, a sync symbol 120, i.e., a training symbol and multiple data symbols 130.

The null symbol 110 is an interval having no signal. The sync symbol 120 is a special training symbol having an auto-correlation function with excellent properties (or excellent autocorrelation properties), which used in a synchronization process performed in an OFDM receiver. The multiple data symbols 130 are encoded data.

Figure 2:
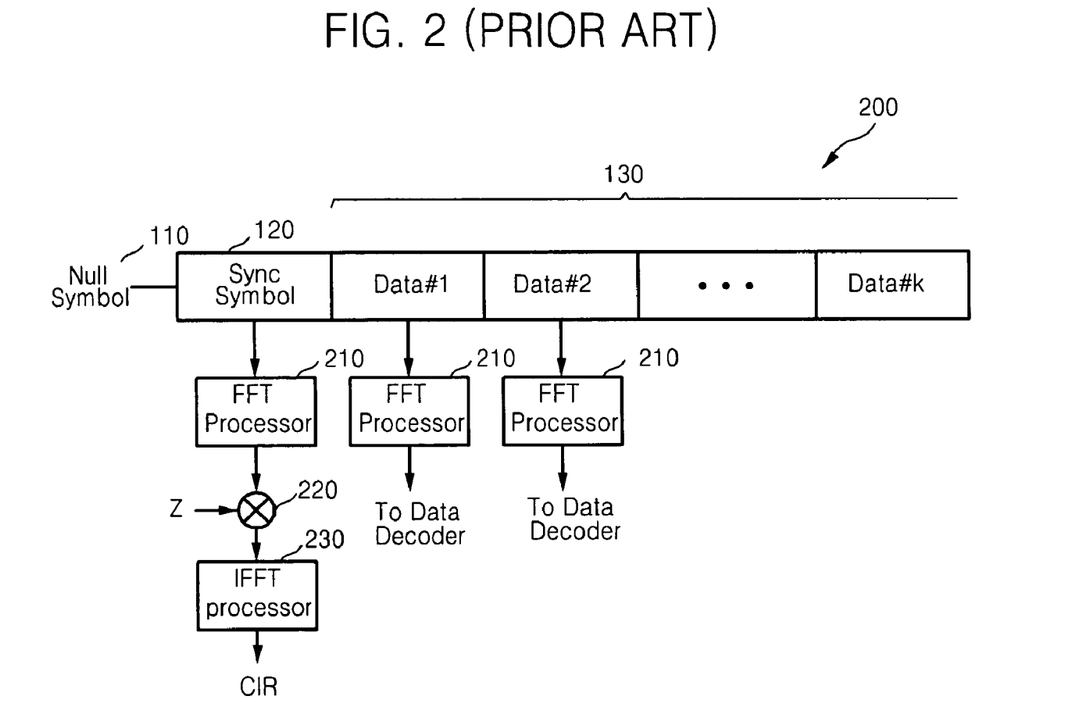
FIG. 2 is a flow diagram illustrating operations for obtaining a channel impulse response (CIR) for conventional synchronization circuits of OFDM receivers using a fast Fourier transform (FFT) processor and an inverse FFT (IFFT) processor.

Referring now to FIG. 2, a flow diagram illustrating operations for obtaining a CIR will be discussed. As illustrate in FIG. 2, conventional synchronization circuits 200 of an OFDM receiver include an FFT processor 210, a multiplier 220, and an IFFT processor 230. The sync symbol 120 is fast Fourier transformed by the FFT processor 210 and then output to the multiplier 220. A fast Fourier transformed sync symbol is input to the multiplier 220 together with a training symbol Z and is multiplies the training symbol Z by the multiplier 220. A multiplication result is output to the IFFT processor 230.

The multiplication result is inverse fast Fourier transformed by the IFFT processor 230, whereby a CIR is generated. The multiple data symbols 130 are fast Fourier transformed by the FFT processor 210. The synchronization circuit 200 includes the IFFT processor 230 in addition to the FFT processor 210 and performs both of FFT and IFFT during a period of the sync symbol 120.

Figure 3:
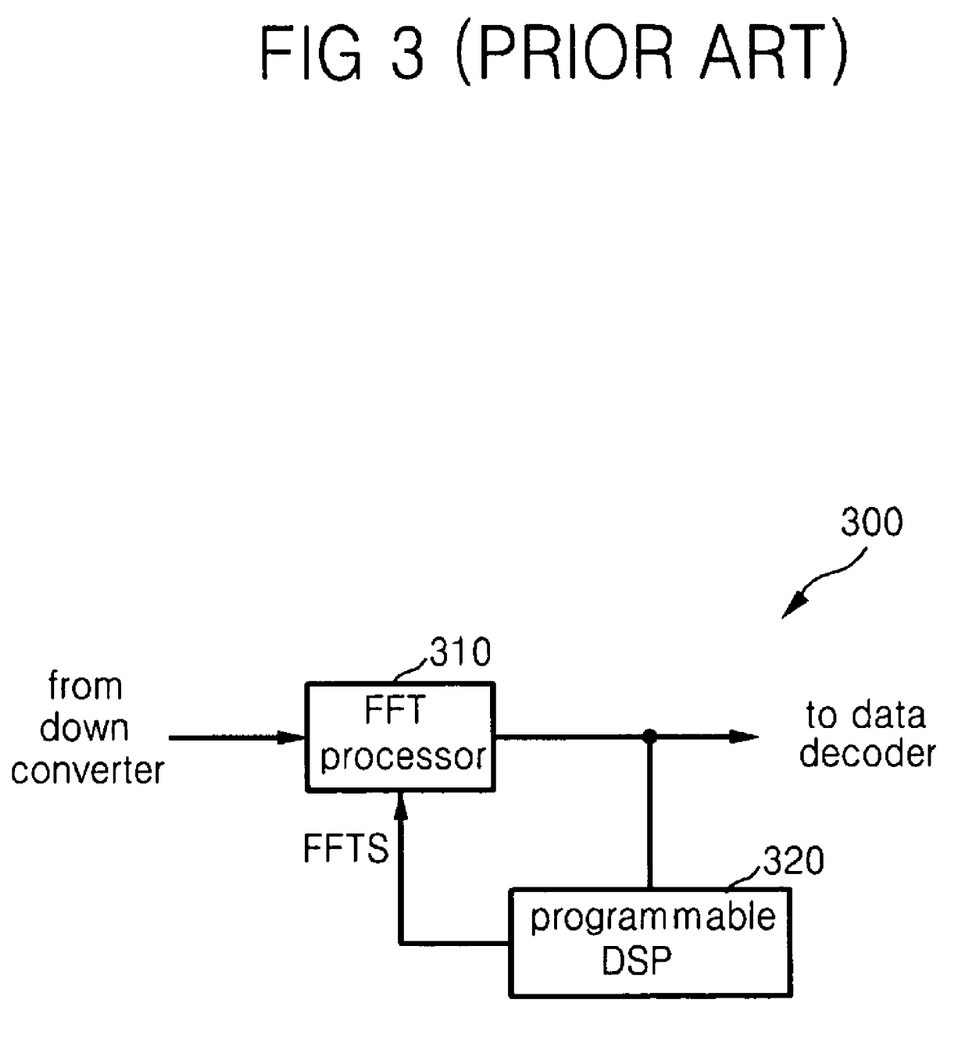
FIG. 3 is a block diagram illustrating conventional synchronization circuits of an OFDM receiver using a digital signal processor (DSP).

Referring now to FIG. 3, a block diagram of conventional synchronization circuits 300 of an OFDM receiver using a digital signal processor (DSP) will be discussed. As illustrated in FIG. 3, the synchronization circuit 300 includes an FFT processor 310 and a programmable DSP 320. The programmable DSP 320 may functions as both of the multiplier 220 and the IFFT processor 230 discussed above with respect to FIG. 2. The synchronization circuit 300 includes the programmable DSP 320 in addition to the FFT processor 310 and performs both of FFT and IFFT during a period of the sync symbol 120.

When a synchronization circuit of an OFDM receiver is implemented by a single DSP, synchronization performance and hardware efficiency may be increased. However, power consumption and costs may also increase.

SUMMARY OF THE INVENTION

Some embodiments of the present invention provide synchronization circuits for orthogonal frequency division multiplexing (OFDM) receivers. The synchronization circuits include a fast Fourier transform (FFT) processor and a synchronization unit. The FFT processor is configured to perform FFT of an input signal. The synchronization unit is configured to obtain a channel impulse response (CIR) using an output signal of the FFT processor and relocate an FFT window based on the CIR.

In further embodiments of the present invention, the FFT processor may include first and second buffers and an FFT logic module. The first buffer may be configured to store the input signal. The FFT logic module may be configured to perform FFT of an output signal of the first buffer. The second buffer may be configured to bit-reverse an output signal of the FFT logic module.

In still further embodiments of present invention, the synchronization unit may include a CIR generation unit and a CIR analyzer. The CIR generation unit may be configured to obtain the CIR using the output signal of the FFT processor. The CIR analyzer may be configured to analyze the CIR and generate an FFT signal for relocating the FFT window based on an analyzing result.

In some embodiments of the present invention, the CIR generation unit may include a control unit and a signal generation unit. The control unit may be configured to generate a selection signal and a CIR analyzing signal based on OFDM frame information of a first input signal and the FFT signal. The signal generation unit may be configured to generate a second input signal and a third input signal based on the first input signal and selectively output one of the first, second and third input signals to the FFT processor responsive to the selection signal.

In further embodiments of the present invention, the control unit may include a frame detector, a symbol counter and a controller. The frame detector may be configured to detect a null symbol in an OFDM frame of the first input signal and generate a reset signal. The symbol counter may be configured to count OFDM symbols in the first input signal responsive to the FFT signal, generate a count value, and reset the count value responsive to the reset signal. The controller may be configured to generate the selection signal and the CIR analyzing signal based on the count value.

In still further embodiments of the present invention, the signal generation unit may include a delay circuit, a phase reference signal generator, a multiplier, a complex conjugator, and a selector. The delay circuit may be configured to receive the first input signal and output the second input signal resulting from delaying the first input signal by a 1-symbol period. The phase reference signal generator may be configured to generate a training symbol. The multiplier may be configured to receive the output signal of the FFT processor and the training symbol output from the phase reference signal generator, multiply the two received signals by each other, and output a signal corresponding to a multiplication result. The complex conjugator may be configured to generate the third input signal corresponding to a complex conjugate of the signal output from the multiplier. The selector may be configured to selectively output one of the first, second and third input signals to the FFT processor responsive to the selection signal.

In some embodiments of the present invention, the FFT processor may be configured to perform FFT of the third input signal responsive to the FFT signal and obtain the CIR responsive to outputting the third input signal from the selector.

In further embodiments of the present invention, the CIR analyzer may be further configured to receive the CIR from the FFT processor, analyze the CIR responsive to the CIR analyzing signal, and generate the FFT signal for relocating the FFT window based on the analyzing result.

Although embodiments of the present invention are discussed above primarily with respect to synchronization circuits, related receivers, methods and computer program products are also provided herein.

DETAILED DESCRIPTION OF EMBODIMENTS OF THE PRESENT INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Like numbers refer to like elements throughout.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: a portable computer diskette, a random access memory (RAM), a read-only memory (ROM), an erasable programmable read-only memory (EPROM or Flash memory), an optical fiber, and a portable compact disc read-only memory (CD-ROM).

The present invention is described below with reference to block diagrams and/or flowchart illustrations of equalizers, methods and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 4:
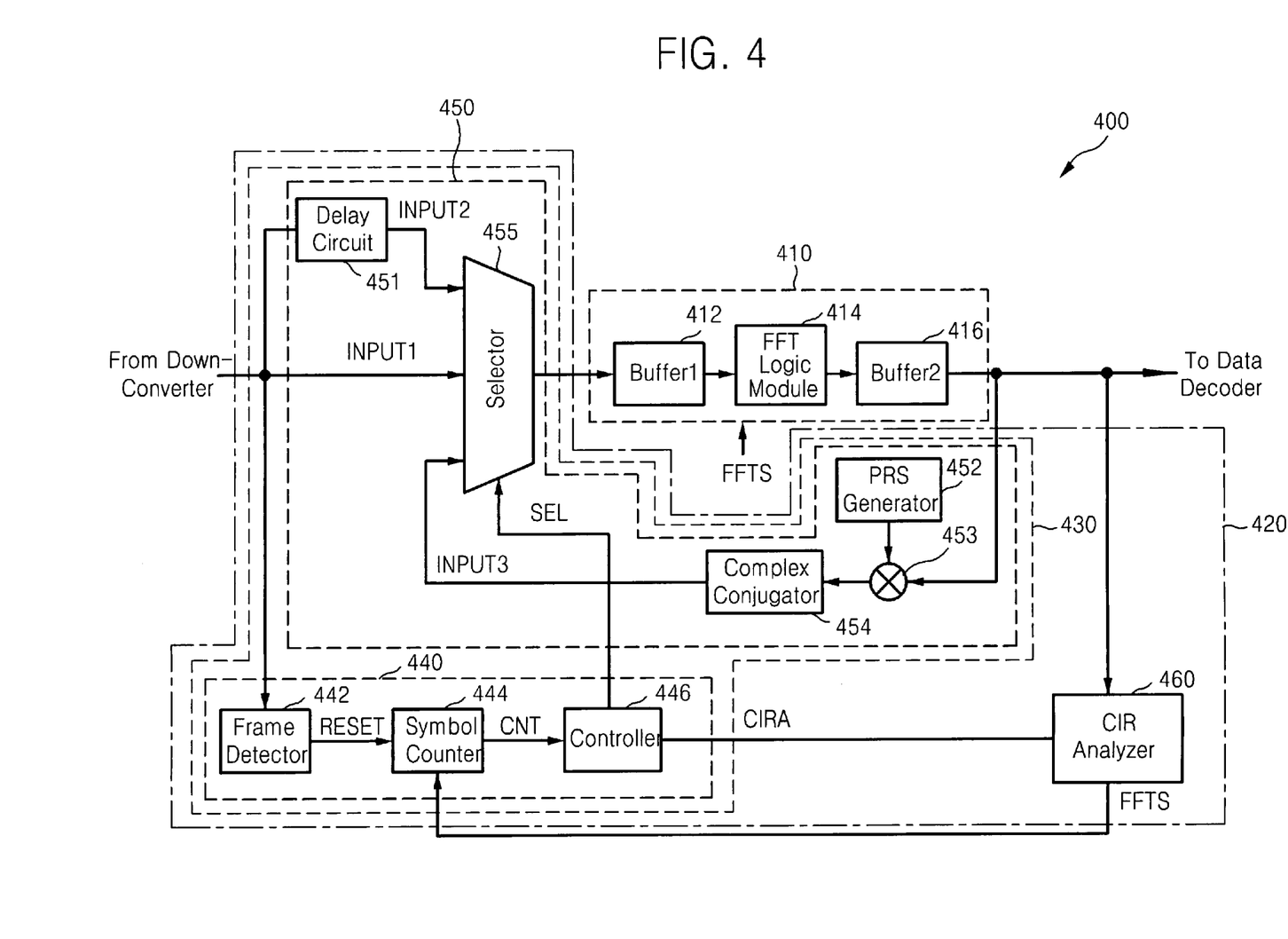
FIG. 4 illustrates synchronization circuits for an OFDM receiver according to some embodiments of the present invention.

Referring first to FIG. 4, a block diagram illustrating synchronization circuits 400 for orthogonal frequency division multiplexing (OFDM) receivers according to some embodiments of the present invention will be discussed. As illustrated in FIG. 4, the synchronization circuit 400 includes a fast Fourier transform (FFT) processor 410 and a synchronization unit 420.

The FFT processor 410 is configured to perform a FFT of an input signal. The FFT processor 410 includes a first buffer 412, an FFT logic module 414, and a second buffer 416. The first buffer 412 buffers the input signal, for example, the input signal may be buffered in a size in which the FFT logic module 414 performs FFT. The FFT logic module 414 receives the buffered signal from the first buffer 412 and performs FFT of the buffered signal. The second buffer 416 bit-reverses the fast Fourier transformed signal.

As illustrated, the synchronization unit 420 includes a CIR generation unit 430 and a CIR analyzer 460. The synchronization unit 420 generates a channel impulse response (CIR) using an output signal of the FFT processor 410 without using an additional inverse FFT (IFFT) processor or digital signal processor (DSP) and generates an FFT signal FFTS for relocating (or reconstructing) an FFT window based on the CIR. The CIR generation unit 430 includes a control unit 440 and a signal generation unit 450 and generates a CIR using the FFT processor 410.

To generate the CIR without the additional IFFT processor or DSP, the synchronization circuit 400 performs IFFT using the FFT processor 410. The synchronization circuit 400 for an OFDM receiver according to some embodiments of the present invention uses the fact that a result of performing IFFT with respect to a complex number X is the same as a complex conjugate of a result of performing FFT with respect to a complex conjugate $X^*$ of the complex number X, i.e., $IFFT(X)=[FFT(X^*)]^*$.

An OFDM receiver using the synchronization circuit 400 multiplies a signal resulting from performing FFT of a training symbol by the training symbol and then performs FFT with respect to a complex conjugate of a multiplication result, instead of performing IFFT, to obtain a CIR.

The control unit 440 generates a selection signal SEL and a CIR analyzing signal CIRA based on OFDM frame information of a first input signal INPUT1 and the FFT signal FFTS. As illustrated, the control unit 440 includes a frame detector 442, a symbol counter 444, and a controller 446. The frame detector 442 generates a reset signal RESET in response to a null symbol in a received OFDM frame.

The symbol counter 444 counts symbols in the OFDM frame of the first input signal INPUT1 based on the FFT signal FFTS and outputs a count value CNT to the controller 446. The symbol counter 444 initializes the count value CNT in response to the reset signal RESET output from the frame detector 442. In other words, the symbol counter 444 resets the count value CNT when a new OFDM frame begins. The controller 446 generates the selection signal SEL and the CIR analyzing signal CIRA based on the count value CNT.

The signal generation unit 450 includes a delay circuit 451, a phase reference symbol (PRS) generator 452, a multiplier 453, a complex conjugator 454, and a selector 455. The signal generation unit 450 generates a second input signal INPUT2 and a third input signal INPUT3 based on the first input signal INPUT1 and selectively outputs one of the first through third input signals INPUT1~INPUT3 to the FFT processor 410.

The delay circuit 451 receives the first input signal INPUT1 and delays it by a 1-symbol of the OFDM frame, thereby generating the second input signal INPUT2.

The PRS generator 452 generates a training symbol known to both a transmitter and a receiver. The multiplier 453 receives a signal resulting from performing FFT with respect to a received sync signal output from the FFT processor 410 and the training symbol, multiplies the two signals by each other, and outputs a multiplication result.

The complex conjugator 454 inverts an imaginary number of a signal output from the multiplier 453, thereby generating the third input signal INPUT3 corresponding to a complex conjugate of the multiplication result. The selector 455 selectively outputs one of the first through third input signals INPUT1~INPUT3 to the FFT processor 410 in response to the selection signal SEL. In some embodiments of the present invention, the selector 455 may be implemented by a multiplexer. However, it will be understood that embodiments of the present invention are not limited to this configuration.

The CIR analyzer 460 receives the CIR output from the FFT processor 410, analyzes the CIR in response to the CIR analyzing signal CIRA output from the controller 446, and generates the FFT signal FFTS for relocating the FFT window based on an analyzing result.

Figure 5:
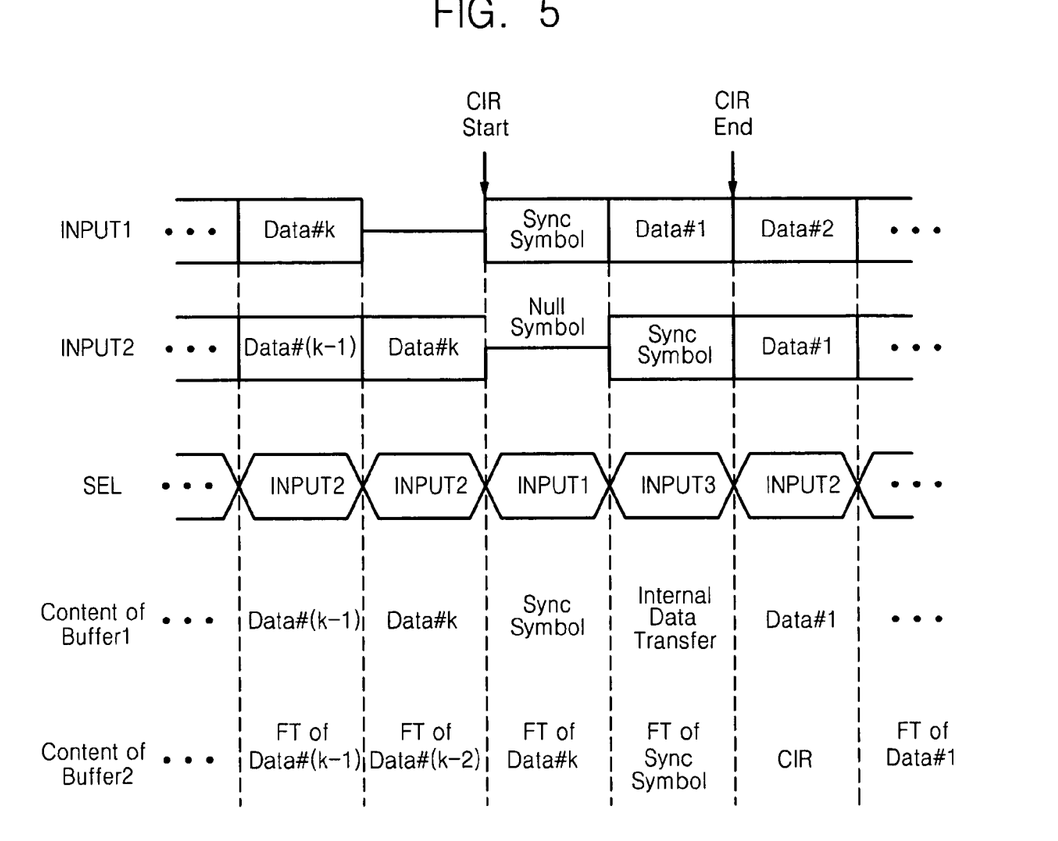
FIG. 5 is a timing diagram illustrating steps for obtaining a CIR in the synchronization circuit illustrated in FIG. 4 according to some embodiments of the present invention.

FIG. 5 is a timing diagram illustrating steps for obtaining a CIR in the synchronization circuit 400 illustrated in FIG. 4 according to some embodiments of the present invention. Steps for obtaining a CIR in the synchronization circuit 400 will be discussed with reference to FIGS. 4 and 5 below.

The delay circuit 451 receives the first input signal INPUT1 and delays it by a 1-symbol (period) of an OFDM frame, thereby generating the second input signal INPUT2. The selector 455 selectively outputs the first input signal INPUT1 in response to the selection signal SEL output from the controller 446. The first buffer 412 stores a sync symbol in the current OFDM frame of the first input signal INPUT1. Here, a signal "FT of data#k" obtained by performing FFT of a last data symbol among plurality of data symbols in a previous OFDM frame has been stored in the second buffer 416.

The selector 455 selectively outputs the first input signal INPUT1 in response to the selection signal SEL output from the controller 446 during first symbol interval, the selector 455 selectively outputs the third input signal INPUT3 in response to the selection signal SEL output from the controller 446 during second symbol interval, the selector 455 selectively outputs the second input signal INPUT2 in response to the selection signal SEL output from the controller 446 during kth symbol interval, where k (k>2) is the number of symbols in the transmission frame.

The FFT logic module 414 performs FFT of the sync symbol in the current OFDM frame of the first input signal INPUT1 and outputs a fast Fourier transformed sync symbol "FT of sync symbol". The second buffer 416 stores the fast Fourier transformed sync symbol "FT of sync symbol". The PRS generator 452 generates a training symbol known to both of the transmitter and the receiver. The multiplier 453 receives an output signal of the FFT processor 410 and the training symbol, multiplies the two signals by each other, and outputs a 30 multiplication result to the complex conjugator 454.

The complex conjugator 454 generates the third input signal INPUT3 corresponding to a complex conjugate of an output signal of the multiplier 453 and outputs the third input signal INPUT3 to the selector 455. The selector 455 selectively outputs the third input signal INPUT3 in response to the selection signal SEL. The first buffer 412 stores the third input signal INPUT3. Here, the fast Fourier transformed sync symbol "FT of sync symbol" has been stored in the second buffer 416. The FFT logic module 414 performs FFT of the third input signal INPUT3, thereby generating the CIR. The CIR is stored in the second buffer 416.

The CIR analyzer 460 receives the CIR, analyzes the CIR in response to the CIR analyzing signal CIRA, and generates the FFT signal FFTS for relocating an FFT window based on an analyzing result.

The synchronization circuit 400 for an OFDM receiver according to some embodiments of the present invention generates the CIR during a 2-symbol period between a CIR start and a CIR end in the current OFDM frame. The synchronization circuit 400 obtains a CIR for each OFDM frame. After the CIR is obtained, the FFT processor 410 performs FFT of data symbols in a current OFDM.

The selector 455 selects the second input signal INPUT2 output from the delay circuit 451 in response to the selection signal SEL and outputs the second input signal INPUT 2 to the FFT processor 410. The first buffer 412 stores a first data symbol "data#1" in the second input signal INPUT 2. Here, the CIR has been stored in the second buffer 416.

The FFT logic module 414 performs FFT of the first data symbol "data#1" and outputs a fast Fourier transformed first data symbol "FT of data#1" to the second buffer 416. The second buffer 416 stores the fast Fourier transformed first data symbol "FT of data#1".

While FFT is performed with respect to a plurality of data symbols data#1 through data#k, the selector 455 outputs the second input signal INPUT2 output from the delay circuit 451 to the FFT processor 410 in response to the selection signal SEL.

Figure 6:
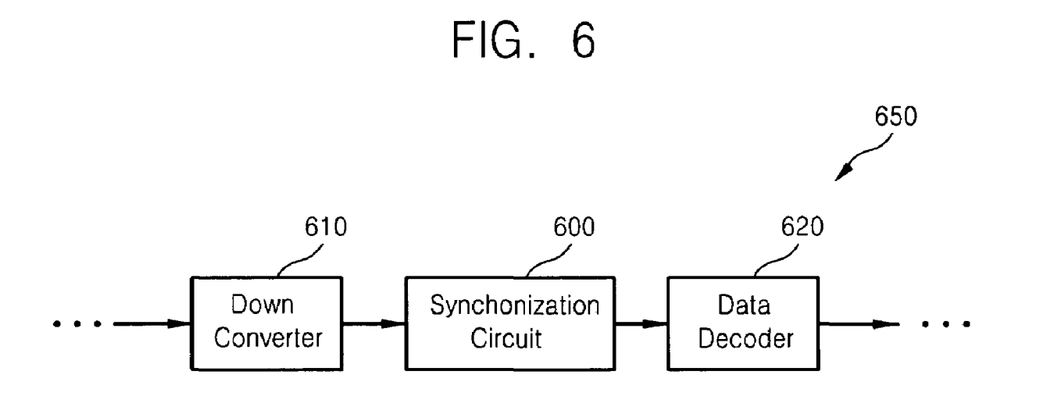
FIG. 6 is a block diagram illustrating an OFDM receiver according to some embodiments of the present invention.

Referring now to FIG. 6, a block diagram illustrating an OFDM receiver 650 according to some embodiments of the present invention will be discussed. As illustrated, the OFDM receiver 650 includes a down converter 610, a synchronization circuit 600, and a data decoder 620.

The down converter 610 converts a signal into a baseband signal and outputs the baseband signal to the synchronization circuit 600. The synchronization circuit 600 receives the baseband signal, performs time synchronization with respect to the baseband signal to avoid symbol interference, and outputs a signal corresponding to a time synchronization result. The data decoder 620 receives the signal output from the synchronization circuit 600 and decodes the received signal.

Figure 7:
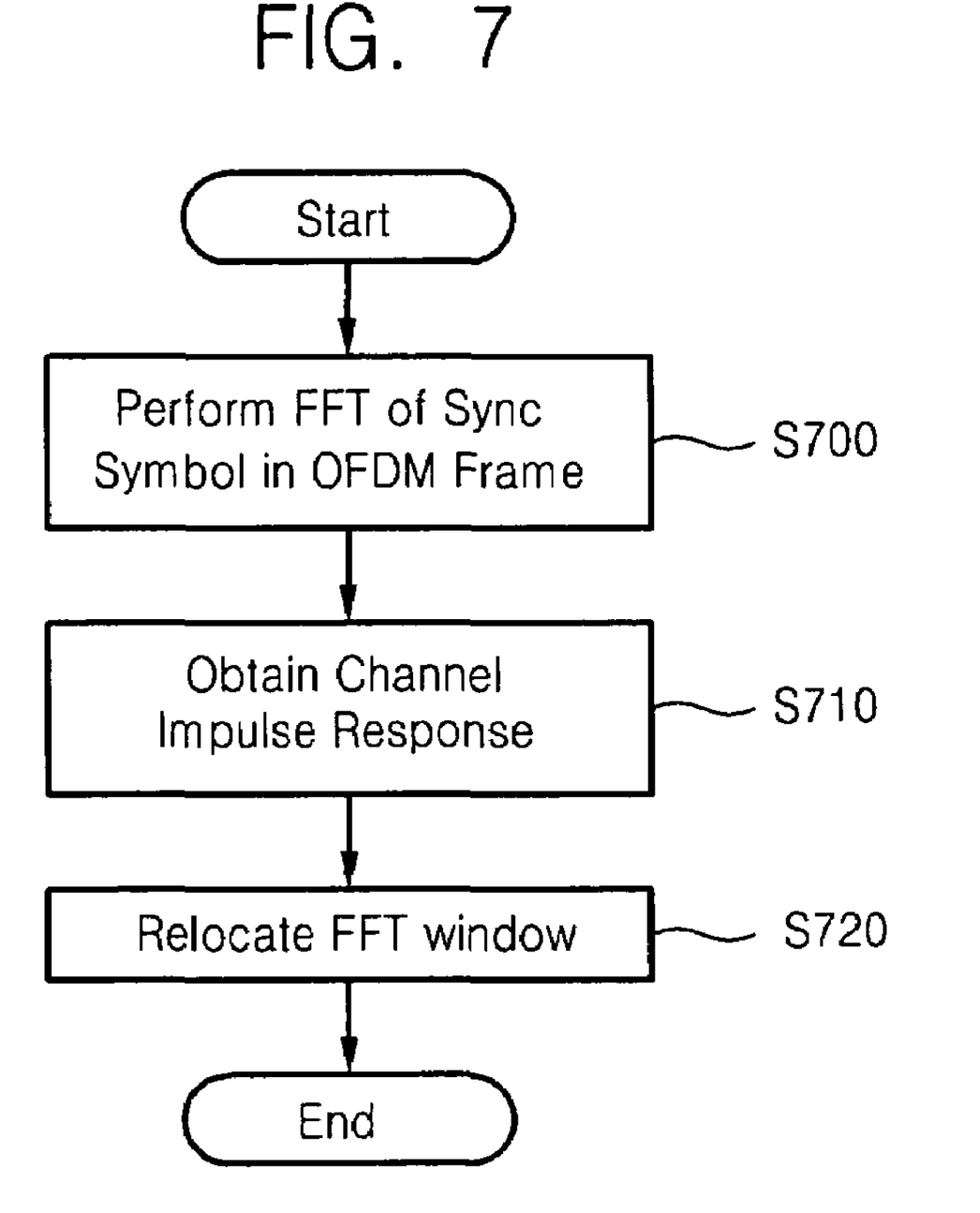
FIG. 7 is a flowchart illustrating operations for synchronization of an OFDM receiver according to some embodiments of the present invention.

FIG. 7 is flowchart illustrating operations for synchronization of an OFDM receiver according to some embodiments of the present invention. Synchronization methods according to some embodiments of the present invention will now be discussed with respect to FIGS. 4 through 7. Operations begin at block 700 by performing FFT of a sync symbol in the first input signal INPUT1. In some embodiments of the present invention, the selector 455 outputs the first input signal INPUT1 among the first through third input signals INPUT1, INPUT2, and INPUT3 to the FFT processor 410. The PRS generator 452 generates a training symbol known to both of the transmitter and the receiver. The multiplier 453 multiplies a signal obtained by performing FFT of the sync symbol by the training symbol and outputs a multiplication result. The complex conjugator 454 receives the multiplication result and inverts only an imaginary number in the multiplication result, thereby generating a signal corresponding to a complex conjugate of the multiplication result.

The channel impulse response (CIR) is obtained (block 710). In some embodiments of the present invention, the FFT processor 410 receives the signal corresponding to the complex conjugate of the multiplication result and performs FFT of the received signal, thereby obtaining the CIR.

The FFT window is relocated (block 720). In some embodiments of the present invention, the CIR analyzer 460 receives the CIR, analyzes the CIR in response to the CIR analyzing signal CIRA, and relocates the FFT window based on an analyzing result.

As discussed briefly above with respect to FIGS. 4 through 7, an OFDM receiver using a synchronization circuit and a synchronization method according to some embodiments of the present invention obtains a CIR using an FFT processor without using an additional IFFT processor or DSP and accomplishes time synchronization. Accordingly, hardware efficiency may be increased while power consumption and costs are decreased.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A synchronization circuit for orthogonal frequency division multiplexing (OFDM) receivers, the synchronization circuit comprising:
 a fast Fourier transform (FFT) processor configured to perform an FFT of an input signal; and
 a synchronization unit configured to obtain a channel impulse response (CIR) using an output signal of the FFT processor and relocate an FFT window based on the CIR,
 wherein the synchronization unit comprises:
 a CIR generation unit configured to obtain the CIR using the output signal of the FFT processor; and
 a CIR analyzer configured to analyze the CIR and generate an FFT signal for relocating the FFT window based on an analyzing result;
 wherein the CIR generation unit comprises:
 a control unit configured to generate a selection signal and a CIR analyzing signal based on OFDM frame information of a first input signal and the FFT signal; and a signal generation unit configured to generate a second input signal and a third input signal based on the first input signal and selectively output one of the first, second and third input signals to the FFT processor responsive to the selection signal.

2. The synchronization circuit of claim 1, wherein the FFT processor comprises:
a first buffer configured to store the input signal;
an FFT logic module configured to perform FFT of an output signal of the first buffer; and
a second buffer configured to bit-reverse an output signal of the FFT logic module.

3. The synchronization circuit of claim 1, wherein the control unit comprises:
a frame detector configured to detect a null symbol in an OFDM frame of the first input signal and generate a reset signal;
a symbol counter configured to count OFDM symbols in the first input signal responsive to the FFT signal, generate a count value, and reset the count value responsive to the reset signal; and
a controller configured to generate the selection signal and the CIR analyzing signal based on the count value.

4. The synchronization circuit of claim 1, wherein the signal generation unit comprises:
a delay circuit configured to receive the first input signal and output the second input signal resulting from delaying the first input signal by a 1-symbol period;
a phase reference signal generator configured to generate a training symbol;
a multiplier configured to receive the output signal of the FFT processor and the training symbol output from the phase reference signal generator, multiply the two received signals by each other, and output a signal corresponding to a multiplication result;
a complex conjugator configured to generate the third input signal corresponding to a complex conjugate of the signal output from the multiplier; and
a selector configured to selectively output one of the first, second and third input signals to the FFT processor responsive to the selection signal.

5. The synchronization circuit of claim 4, wherein the FFT processor is configured to perform FFT of the third input signal responsive to the FFT signal and obtain the CIR responsive to outputting the third input signal from the selector.

6. The synchronization circuit of claim 1, wherein the CIR analyzer is further configured to receive the CIR from the FFT processor, analyze the CIR responsive to the CIR analyzing signal, and generate the FFT signal for relocating the FFT window based on the analyzing result.

7. An orthogonal frequency division multiplexing (OFDM) receiver comprising:
a down converter configured to convert a radio frequency signal into a baseband signal and output the baseband signal;
a synchronization circuit configured to receive the baseband signal, perform time synchronization of the baseband signal to avoid symbol interference in the baseband signal, and output a signal corresponding to a time synchronization result; and
a decoder configured to receive and decode the signal output from the synchronization circuit, wherein the synchronization circuit comprises:
a fast Fourier transform (FFT) processor configured to perform an FFT of an input signal; and
a synchronization unit configured to obtain a channel impulse response (CIR) using an output signal of the FFT processor and relocate an FFT window based on the CIR,
wherein the synchronization unit comprises:
a CIR generation unit configured to obtain the CIR using the output signal of the FFT processor; and
a CIR analyzer configured to analyze the CIR and generate an FFT signal for relocating the FFT window based on an analyzing result;
wherein the CIR generation unit comprises:
a control unit configured to generate a selection signal and a CIR analyzing signal based on OFDM frame information of a first input signal and the FFT signal; and
a signal generation unit configured to generate a second input signal and a third input signal based on the first input signal and selectively output one of the first, second and third input signals to the FFT processor responsive to the selection signal.

8. The OFDM receiver of claim 7, wherein the FFT processor comprises:
a first buffer configured to store the input signal;
an FFT logic module configured to perform FFT of an output signal of the first buffer; and
a second buffer bit-reversing an output signal of the FFT logic module.

9. The OFDM receiver of claim 7, wherein the control unit comprises:
a frame detector configured to detect a null symbol in an OFDM frame of the first input signal and generate a reset signal;
a symbol counter configured to count OFDM symbols in the first input signal responsive to the FFT signal, generate a count value, and reset the count value responsive to the reset signal; and
a controller configured to generate the selection signal and the CIR analyzing signal based on the count value.

10. The OFDM receiver of claim 7, wherein the signal generation unit comprises:
a delay circuit configured to receive the first input signal and output the second input signal resulting from delaying the first input signal by a 1-symbol period;
a phase reference signal generator configured to generate a training symbol;
a multiplier configured to receive the output signal of the FFT processor and the training symbol output from the phase reference signal generator, multiply the two received signals by each other, and output a signal corresponding to a multiplication result;
a complex conjugator configured to generate the third input signal corresponding to a complex conjugate of the signal output from the multiplier; and
a selector selectively configured to output one of the first, second and third input signals to the FFT processor responsive to the selection signal.

11. The OFDM receiver of claim 10, wherein the FFT processor is further configured to perform FFT of the third input signal responsive to the FFT signal and obtain the CIR responsive to outputting the third input signal by the selector.

12. The OFDM receiver of claim 7, wherein the CIR analyzer is further configured to receive the CIR from the FFT processor, analyze the CIR responsive to the CIR analyzing signal, and generate the FFT signal for relocating the FFT window based on the analyzing result.

13. A synchronization method for orthogonal frequency division multiplexing (OFDM) receivers, the synchronization method comprising:

performing on at least one data processing system operations as follows:

performing a fast Fourier transform (FFT) of a sync symbol in a received OFDM frame;

obtaining a channel impulse response (CIR) using an FFT result; and relocating an FFT window based on the CIR, wherein the obtaining of the CIR comprises:

multiplying the FFT result by a training symbol and outputting a signal corresponding to a multiplication result;

generating a signal corresponding to a complex conjugate of the signal corresponding to the multiplication result; and     obtaining the CIR by performing FFT of the signal corresponding to the complex conjugate.

14. The synchronization method of claim 13, wherein the relocating of the FFT window comprises:

receiving the CIR;

analyzing the CIR responsive to a CIR analyzing signal; and relocating the FFT window based on an analyzing result.

15. A computer program product for synchronization in orthogonal frequency division multiplexing (OFDM) receivers, the computer program product comprising:

computer readable storage medium having computer readable program code embodied in said medium, the computer readable program code comprising:

computer readable program code configured to perform a fast Fourier transform (FFT) of a sync symbol in a received OFDM frame;

computer readable program code configured to obtain a channel impulse response (CIR) using an FFT result; and     computer readable program code configured to relocate an FFT window based on the CIR, wherein the computer readable program code configured to obtain the CIR comprises:

computer readable program code configured to multiply the FFT result by a training symbol and outputting a signal corresponding to a multiplication result;

computer readable program code configured to generate a signal corresponding to a complex conjugate of the signal corresponding to the multiplication result; and         computer readable program code configured to obtain the CIR by performing FFT of the signal corresponding to the complex conjugate.

16. The computer program product of claim 15, wherein the computer readable program code configured to relocate of the FFT window comprises:

computer readable program code configured to receive the CIR;

computer readable program code configured to analyze the CIR responsive to a CIR analyzing signal; and computer readable program code configured to relocate the FFT window based on an analyzing result.

* * * * *